(12) United States Patent
Choi

(10) Patent No.: US 11,772,480 B2
(45) Date of Patent: Oct. 3, 2023

(54) TRANSAXLE-INTEGRATED COOLING CIRCULATION SYSTEM

(71) Applicant: DRIVETECH CO., LTD., Bucheon-si (KR)

(72) Inventor: Yun Yong Choi, Gimpo-si (KR)

(73) Assignee: DRIVETECH CO., LTD., Bucheon-si (KR)

( * ) Notice: Subject to any disclaimer, the term of this patent is extended or adjusted under 35 U.S.C. 154(b) by 458 days.

(21) Appl. No.: 17/070,268

(22) Filed: Oct. 14, 2020

(65) Prior Publication Data

US 2021/0107350 A1 Apr. 15, 2021

(30) Foreign Application Priority Data

Oct. 15, 2019 (KR) .................. 10-2019-0127407

(51) Int. Cl.
*B60K 11/02* (2006.01)
*B60K 7/00* (2006.01)
*B60K 1/00* (2006.01)

(52) U.S. Cl.
CPC ............ *B60K 11/02* (2013.01); *B60K 7/0007* (2013.01); *B60K 2001/006* (2013.01); *B60L 2240/421* (2013.01); *B60L 2240/425* (2013.01)

(58) Field of Classification Search
CPC ............... B60K 11/02; B60K 7/0007; B60K 2001/006; B60L 2240/421; B60L 2240/425
See application file for complete search history.

(56) References Cited

U.S. PATENT DOCUMENTS

| 11,011,954 | B2* | 5/2021 | Okuhata | F16H 48/12 |
| 11,577,600 | B2* | 2/2023 | Wang | H02K 5/203 |
| 2007/0248861 | A1* | 10/2007 | Hoshi | H01M 16/006 |
| | | | | 429/513 |
| 2010/0191417 | A1* | 7/2010 | Murahashi | B60B 11/06 |
| | | | | 184/26 |
| 2018/0298840 | A1* | 10/2018 | Hagiwara | F02B 43/04 |

FOREIGN PATENT DOCUMENTS

| KR | 10-2009-0130509 A | 12/2009 |
| KR | 10-2029846 B1 | 10/2019 |
| WO | 2014/045707 A1 | 3/2014 |

OTHER PUBLICATIONS

Office Action issued in KR 10-2020-0133365; mailed by the Korean Intellectual Property Office dated Jul. 15, 2022.

* cited by examiner

*Primary Examiner* — Gertrude Arthur Jeanglaude
(74) *Attorney, Agent, or Firm* — Studebaker & Brackett PC

(57) ABSTRACT

A transaxle-integrated cooling circulation system includes a drive motor, an inverter disposed on one surface of the drive motor and electrically connected with the drive motor, a speed reducer including a drive shaft connected with a rotary shaft of the drive motor and a driven shaft having a different RPM from the drive shaft, a first circulation channel extending to allow a lubricating fluid in the speed reducer to make contact with the drive motor, a second circulation channel that is connected with the first circulation channel and that passes through a contact surface between the drive motor and the inverter, and a third circulation channel that is connected with the second circulation channel and that introduces the lubricating fluid into the speed reducer again.

17 Claims, 5 Drawing Sheets

TRANSAXLE-INTEGRATED COOLING CIRCULATION SYSTEM

CROSS-REFERENCE TO RELATED APPLICATIONS

A claim for priority under 35 U.S.C. § 119 is made to Korean Patent Application No. 10-2019-0127407 filed on Oct. 15, 2019 in the Korean Intellectual Property Office, the entire contents of which are hereby incorporated by reference.

BACKGROUND

Embodiments of the inventive concept described herein relate to a transaxle-integrated cooling circulation system.

In general, electric vehicles are manufactured by utilizing excellent torque characteristics and controllability of electric motors. The electric vehicles do not cause any pollution due to combustion at all, as compared with vehicles equipped with existing internal combustion engines, and the control of the motors serving as driving sources is excellent. Accordingly, the electric vehicles have been developed for a long time and have reached a commercialization stage.

An electric vehicle works on the principle that power is generated by driving an electric motor using a storage battery. A vehicle powered by an electric motor is referred to as an electric vehicle.

An electric vehicle includes a transaxle constituted by a motor, an inverter for controlling a current value and an RPM of the motor, and a speed reducer for reducing the speed of the motor.

Recently, a transaxle having a motor and an inverter integrated with each other has been employed for light weight and volume reduction.

However, the transaxle having the motor and the inverter integrated with each other has problems in that heat generated from the motor and the inverter causes a failure in the motor and the inverter and degrades the performance of the transaxle.

Accordingly, the present applicant has developed a transaxle-integrated cooling circulation system that cools a motor and an inverter by using a lubricating fluid received in a speed reducer constituting a transaxle.

SUMMARY

Embodiments of the inventive concept provide a transaxle-integrated cooling circulation system for reducing a failure in a motor and an inverter and improving the performance of a transaxle by cooling the motor and the inverter by circulating a lubricating fluid received in a speed reducer constituting the transaxle.

According to an exemplary embodiment, a transaxle-integrated cooling circulation system includes a drive motor, an inverter disposed on one surface of the drive motor and electrically connected with the drive motor, a speed reducer including a drive shaft connected with a rotary shaft of the drive motor and a driven shaft having a different RPM from the drive shaft, a first circulation channel extending to allow a lubricating fluid in the speed reducer to make contact with the drive motor, a second circulation channel that is connected with the first circulation channel and that passes through a contact surface between the drive motor and the inverter, and a third circulation channel that is connected with the second circulation channel and that introduces the lubricating fluid into the speed reducer again.

The second circulation channel or the third circulation channel may be disposed parallel to a longitudinal direction of the drive motor.

The transaxle-integrated cooling circulation system may further include a first circulator that circulates the lubricating fluid.

The transaxle-integrated cooling circulation system may further include a first heat radiating structure provided on the outside of the drive motor and a second heat radiating structure provided on the outside of the speed reducer.

The transaxle-integrated cooling circulation system may further include an integrated cover structure disposed on a virtual reference line extending from a contact surface between the speed reducer and the drive motor, in which one side of the integrated cover structure may overlap the speed reducer, and an opposite side of the integrated cover structure may overlap the drive motor and the inverter, the opposite side being different from the one side.

The transaxle-integrated cooling circulation system may further include a coolant-filled cooling jacket that surrounds part of the integrated cover structure.

The transaxle-integrated cooling circulation system may further include a third heat radiating structure provided on the outside of the integrated cover structure.

The transaxle-integrated cooling circulation system may further include a receiving member that is located inside the speed reducer and that has a receiving space in which the lubricating fluid is received. The receiving member may include at least one insertion hole through which the lubricating fluid outside the receiving member is received in the receiving member, and the lubricating fluid in the receiving member may be biased and circulated through the first circulation channel or the third circulation channel when the speed reducer is accelerated or decelerated in a first direction.

The transaxle-integrated cooling circulation system may further include a second circulator that circulates the lubricating fluid received in the receiving member into the speed reducer.

The transaxle-integrated cooling circulation system may further include a temperature sensor that measures exothermic temperature of at least one of the drive motor or the inverter and a controller that receives and collects temperature data measured by the temperature sensor.

The transaxle-integrated cooling circulation system may further include a valve disposed in one of the first circulation channel, the second circulation channel, and the third circulation channel and controlled to be opened or closed depending on a control signal, and the controller may transmit a valve control signal to the valve to open the valve, when the temperature data measured by the temperature sensor is higher than or equal to a predetermined temperature.

The controller may be integrated with the inverter.

The controller may transmit the collected temperature data to a central control device that performs control to drive a vehicle, and the central control device may transmit a motor control signal for controlling a current vale and an RPM of the drive motor to the inverter, the motor control signal being generated based on the collected temperature data.

A coolant-filled cooling jacket, a refrigerant sheet, or a cooling element is provided on at least part of the remaining area other than areas of the drive motor and the inverter where the second circulation channel and the third circulation channel pass.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
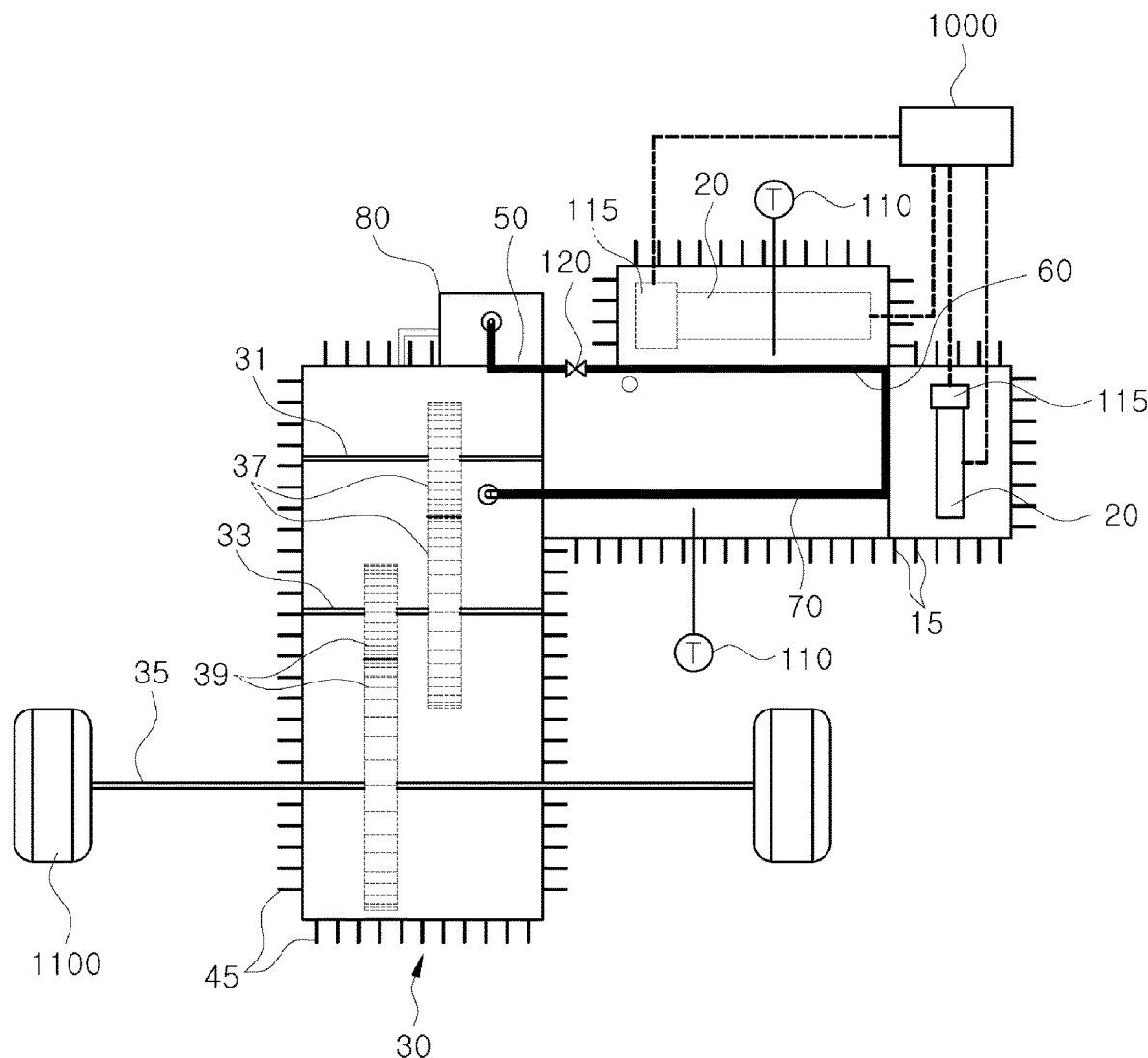
FIG. 1 is a view illustrating a configuration of a transaxle-integrated cooling circulation system according to a first embodiment of the inventive concept.

The above and other aspects, features, and advantages of the inventive concept will become apparent from the following description of embodiments given in conjunction with the accompanying drawings. However, the inventive concept is not limited to the embodiments disclosed herein and may be implemented in various different forms. Herein, the embodiments are provided to provide complete disclosure of the inventive concept and to provide thorough understanding of the inventive concept to those skilled in the art to which the inventive concept pertains, and the scope of the inventive concept should be limited only by the accompanying claims and equivalents thereof.

Terms used herein are only for description of embodiments and are not intended to limit the inventive concept. As used herein, the singular forms are intended to include the plural forms as well, unless context clearly indicates otherwise. It will be further understood that the terms "comprise" and/or "comprising" specify the presence of stated features, components, and/or operations, but do not preclude the presence or addition of one or more other features, components, and/or operations. In addition, identical numerals will denote identical components throughout the specification, and the meaning of "and/or" includes each mentioned item and every combination of mentioned items. It will be understood that, although the terms first, second, etc. may be used herein to describe various components, these components should not be limited by these terms. These terms are only used to distinguish one component from another component. Thus, a first component discussed below could be termed a second component without departing from the teachings of the inventive concept.

Unless otherwise defined, all terms (including technical and scientific terms) used herein have the same meaning as commonly understood by those skilled in the art to which the inventive concept pertains. It will be further understood that terms, such as those defined in commonly used dictionaries, should not be interpreted in an idealized or overly formal sense unless expressly so defined herein.

Hereinafter, embodiments of the inventive concept will be described in detail with reference to the accompanying drawings.

Prior to the description, it should be noted that components having identical configurations in the embodiments are denoted by identical reference numerals and representatively described in a first embodiment and components different from those in the first embodiment are described in the other embodiments.

Figure 2:
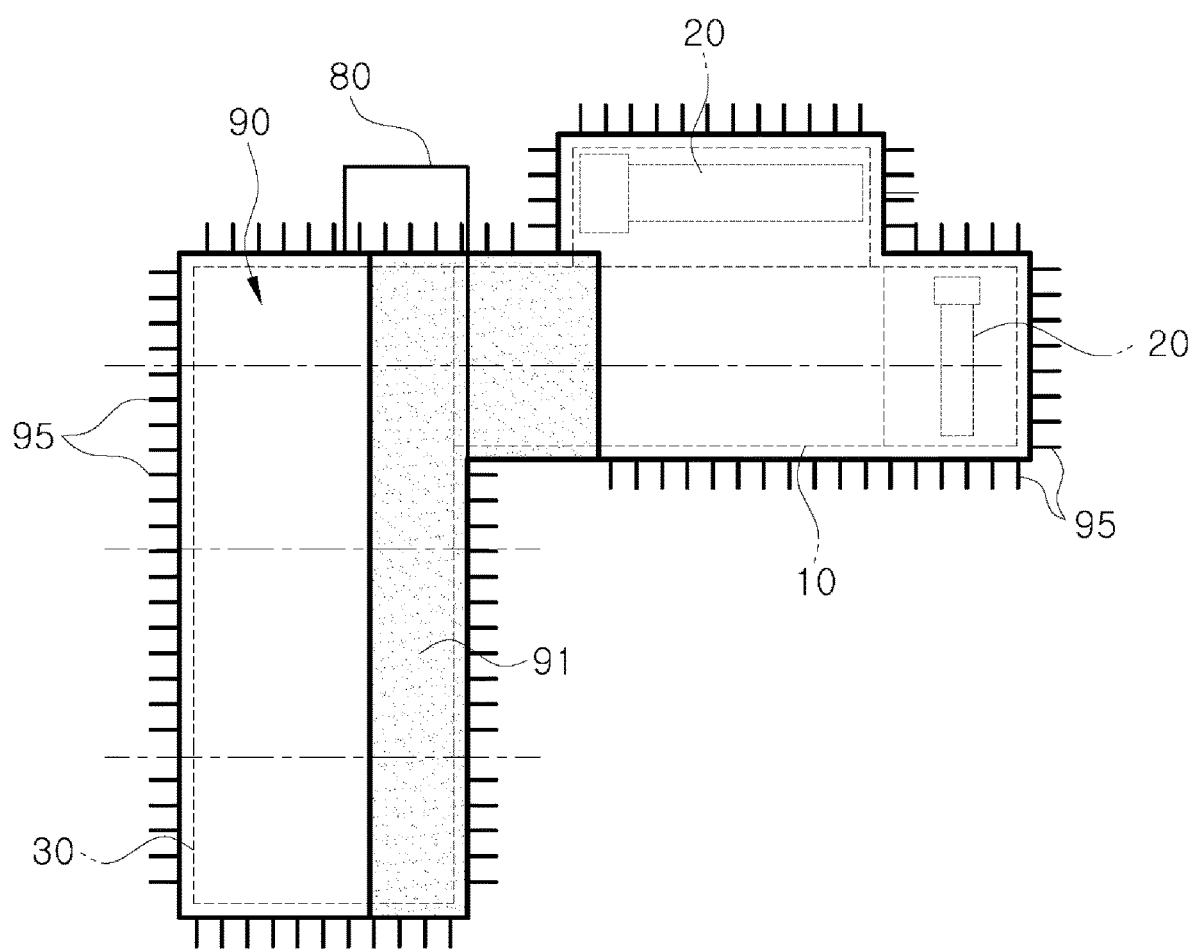
FIG. 2 is a view illustrating a configuration of an integrated cover structure provided in the transaxle-integrated cooling circulation system according to the first embodiment of the inventive concept.

FIGS. 1 and 2 illustrate a transaxle-integrated cooling circulation system according to a first embodiment of the inventive concept.

As illustrated in the drawings, the transaxle-integrated cooling circulation system according to the first embodiment of the inventive concept includes a drive motor 10, an inverter 20, a speed reducer 30, a first circulation channel 50, a second circulation channel 60, and a third circulation channel 70.

The drive motor 10, the inverter 20, and the speed reducer 30 are integrally connected to constitute a transaxle.

The drive motor 10 rotates by receiving electric power from the outside.

A first heat radiating structure 15 is provided on the outside of the drive motor 10. The first heat radiating structure 15 cools the drive motor 10 by radiating heat generated from the drive motor 10. The first heat radiating structure 15 may include a plurality of heat radiating fins that protrude from a surface of the drive motor 10 and that release heat by making contact with air. The first heat radiating structure 15 may include a coolant-filled cooling jacket.

The inverter 20 is disposed on one surface of the drive motor 10 and is electrically connected with the drive motor 10. The inverter 20 controls a current value and an RPM of the drive motor 10 under the control of a central control device 1000 of a vehicle.

The speed reducer 30 reduces the RPM of the drive motor 10 and transmits power from the drive motor 10 to wheels 1100 of the vehicle.

The speed reducer 30 includes a drive shaft 31 connected with a rotary shaft of the drive motor 10 and a driven shaft 35 that has a different RPM from the drive shaft 31 and that transmits power of the drive motor 10 to the wheels 1100 of the vehicle. The speed reducer 30 further includes a power transmission shaft 33 that is disposed between the drive shaft 31 and the driven shaft 35 and that transmits power of the drive shaft 31 to the driven shaft 35.

A plurality of pairs of gears 37 and 39 in series are received in an enclosed casing of the speed reducer 30.

The pair of first stage gears 37 for reducing the RPM of the drive motor 10 at a predetermined ratio are mounted on the drive shaft 31 and the power transmission shaft 33. The pair of second stage gears 39 for reducing the RPM of the drive motor 10 at a predetermined ratio are mounted on the power transmission shaft 33 and the driven shaft 35.

Accordingly, the RPM of the drive motor 10 is reduced at a predetermined gear reduction ratio by the pair of first stage gears 37 and the pair of second stage gears 39 of the speed reducer 30 and is output to the wheels 1100 through the driven shaft 35.

A second heat radiating structure 45 is provided on the outside of the speed reducer 30. The second heat radiating structure 45 cools the speed reducer 30 by radiating heat generated from the speed reducer 30. The second heat radiating structure 45 may include a plurality of heat radiating fins that protrude from a surface of the casing of the speed reducer 30 and that release heat by making contact with air. The second heat radiating structure 45 may include a coolant-filled cooling jacket.

The speed reducer 30 has a lubricating fluid received therein. The lubricating fluid serves to lubricate the gears 37 and 39 so as to prevent the gears 37 and 39 from being worn and overheated and prevent noise caused by the gears 37 and 39. The lubricating fluid received in the speed reducer 30 contains an ingredient resistant to heat.

Accordingly, the transaxle-integrated cooling circulation system according to the first embodiment of the inventive concept employs the lubricating fluid in the speed reducer 30 as a cooling fluid of the inventive concept.

The first circulation channel 50 has a hollow pipe shape having a fluid channel formed therein in which the lubricating fluid flows.

The first circulation channel 50 is connected to one side of the speed reducer 30 and extends so as to make contact with the drive motor 10.

The second circulation channel 60 has a hollow pipe shape having a fluid channel formed therein in which the lubricating fluid delivered from the first circulation channel 50 flows.

The second circulation channel 60 is connected to the first circulation channel 50 and extends so as to pass through a contact surface between the drive motor 10 and the inverter 20. The second circulation channel 60 may be disposed parallel to the longitudinal direction of the drive motor 10. The longitudinal direction of the drive motor 10 may refer to the axial direction of the drive motor 10. However, the second circulation channel 60 is not limited thereto, and in regard to the direction in which the second circulation channel 60 is disposed, no special limitation applies to the direction in which the second circulation channel 60 is disposed, as long as the second circulation channel 60 extends so as to pass through the contact surface between the drive motor 10 and the inverter 20. For example, the second circulation channel 60 may be disposed in a direction perpendicular to the longitudinal direction of the drive motor 10.

The third circulation channel 70 has a hollow pipe shape having a fluid channel formed therein in which the lubricating fluid delivered from the second circulation channel 60 flows.

One end portion of the third circulation channel 70 is connected to the second circulation channel 60, and an opposite end portion of the third circulation channel 70 is connected to an opposite side of the speed reducer 30. The third circulation channel 70 introduces the lubricating fluid passing through the second circulation channel 60 into the speed reducer 30 again. The third circulation channel 70 may be disposed parallel to the longitudinal direction of the drive motor 10.

Accordingly, in the transaxle-integrated cooling circulation system according to the first embodiment of the inventive concept, the first circulation channel 50, the second circulation channel 60, and the third circulation channel 70 are connected in series to form one circulation channel through which the lubricating fluid of the speed reducer 30 circulates.

Meanwhile, the transaxle-integrated cooling circulation system according to the first embodiment of the inventive concept further includes a first circulator 80 for circulating the lubricating fluid.

The first circulator 80 may be implemented with a pump. In this embodiment, the first circulator 80 is provided on the first circulation channel 50. Alternatively, the first circulator 80 may be provided on the second circulation channel 60 or the third circulation channel 70 rather than the first circulation channel 50. Furthermore, a filter (not illustrated) may be provided on the first circulation channel 50 to prevent infiltration of impurities into the first circulation channel 50.

Accordingly, the first circulator 80 forcibly circulates the lubricating fluid received in the speed reducer 30 such that the lubricating fluid is released from the speed reducer 30 and then introduced into the speed reducer 30 again after sequentially passing through the first circulation channel 50, the second circulation channel 60, and the third circulation channel 70.

The lubricating fluid absorbs heat generated from the drive motor 10 and the inverter 20 while passing through the second circulation channel 60 and additionally absorbs heat generated from the drive motor 10 while passing through the third circulation channel 70, thereby cooling the drive motor 10 and the inverter 20.

Although not illustrated, a coolant-filled cooling jacket, a refrigerant sheet, or a cooling element for releasing heat generated from the drive motor 10 and the inverter 20 to the outside may be provided on at least part of the remaining area other than the areas of the drive motor 10 and the inverter 20 where the second circulation channel 60 and the third circulation channel 70 pass.

The transaxle-integrated cooling circulation system according to the first embodiment of the inventive concept further includes an integrated cover structure 90.

As illustrated in FIG. 2, the integrated cover structure 90 is disposed on a virtual reference line extending from a contact surface between the speed reducer 30 and the drive motor 10. One side of the integrated cover structure 90 overlaps the speed reducer 30, and an opposite side of the integrated cover structure 90 overlaps the drive motor 10 and the inverter 20, the opposite side being different from the one side.

Accordingly, the integrated cover structure 90 covers and protects the speed reducer 30, the drive motor 10, and the inverter 20.

Meanwhile, the integrated cover structure 90 may include a coolant-filled cooling jacket 91.

The cooling jacket 91 surrounds part of the integrated cover structure 90.

The integrated cover structure 90 may further include a third heat radiating structure 95 on the outside thereof.

The third heat radiating structure 95 may include a plurality of heat radiating fins that protrude from a surface of the integrated cover structure 90 and that release heat by making contact with air.

Figure 3:
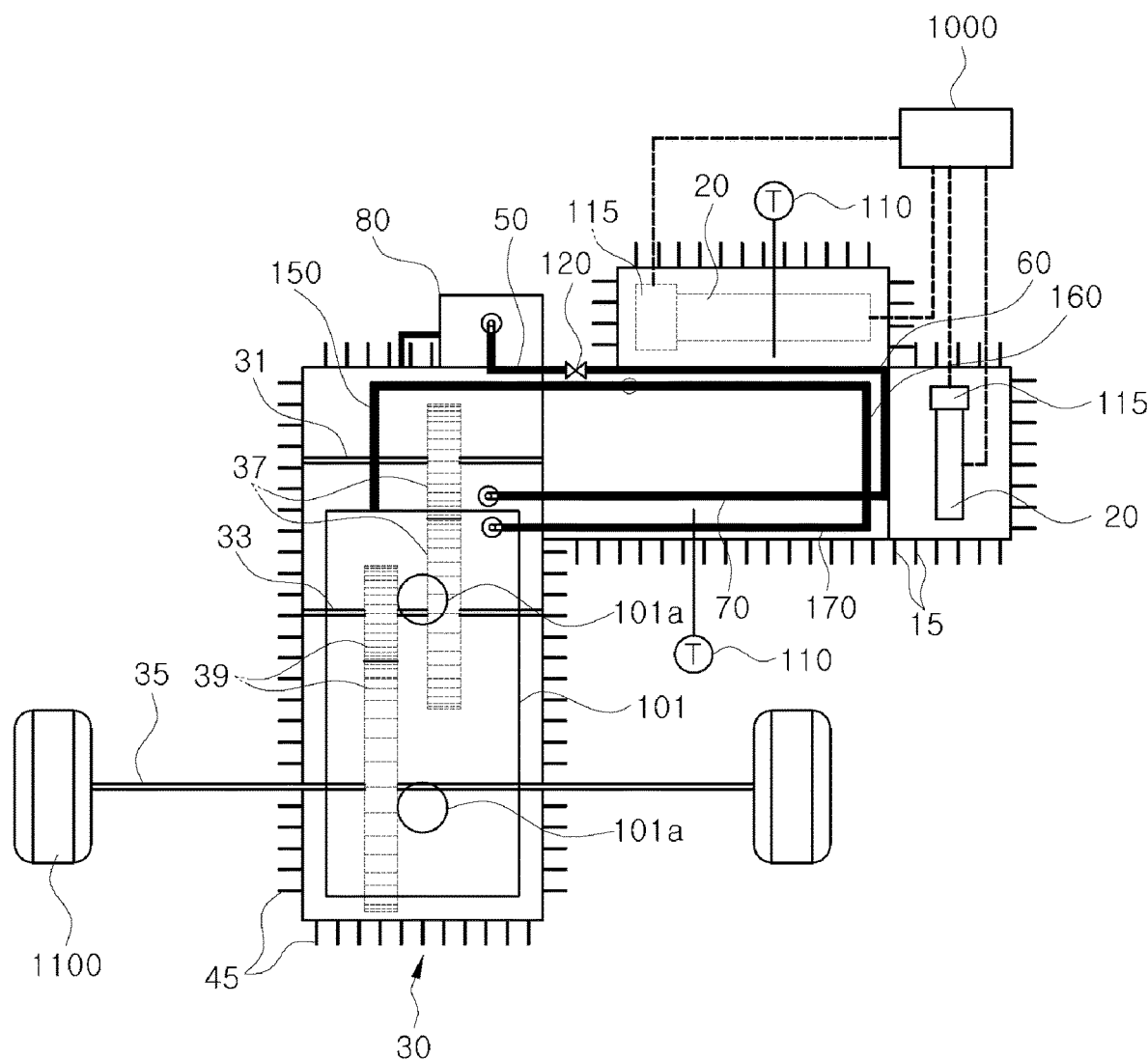
FIG. 3 is a view illustrating a configuration of a transaxle-integrated cooling circulation system according to a second embodiment of the inventive concept.
Figure 4:
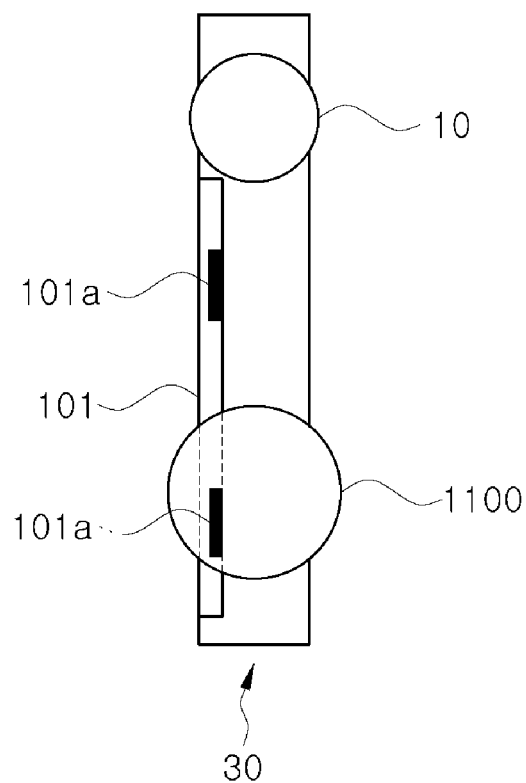
FIG. 4 is a side view illustrating an arrangement relationship between a speed reducer and a receiving member of FIG. 3.
Figure 5:
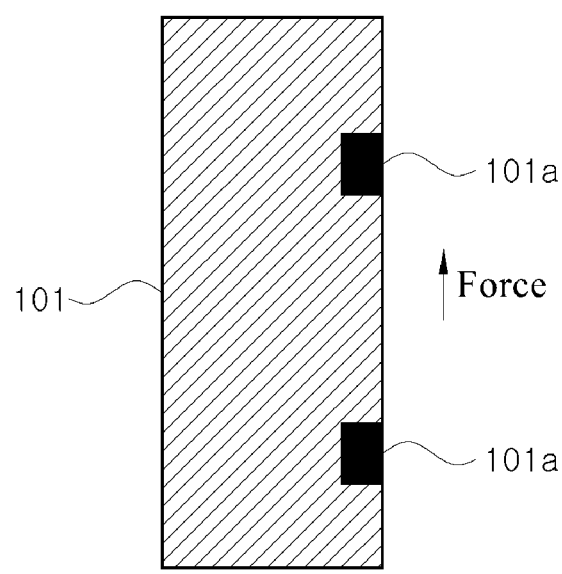
FIG. 5 is a side view illustrating the receiving member.

FIGS. 3 to 5 illustrate a transaxle-integrated cooling circulation system according to a second embodiment of the inventive concept.

As illustrated in these drawings, unlike the above-described transaxle-integrated cooling circulation system according to the first embodiment of the inventive concept, the transaxle-integrated cooling circulation system according to the second embodiment of the inventive concept further includes a receiving member 101.

Referring to FIG. 3, the receiving member 101 may be located in the speed reducer 30 and may be disposed on a bottom side of the speed reducer 30. Because the receiving member 101 is disposed on the bottom side of the speed reducer 30, the lubricating fluid in the speed reducer 30 may be easily received in the receiving member 101. In some embodiments, the receiving member 101 may be integrally formed with the speed reducer 30, or may be coupled to the speed reducer 30 as a member separate from the speed reducer 30.

The receiving member 101 has a receiving space inside, and at least one insertion hole 101a is formed in at least one surface of the receiving member 101. Accordingly, the lubricating fluid outside the receiving member 101 may be received in the receiving member 101 through the insertion hole 101a.

The receiving member 101 is in communication with a first auxiliary circulation channel 150, a second auxiliary circulation channel 160, and a third auxiliary circulation channel 170. Specifically, the receiving member 101 is connected with the first auxiliary circulation channel 150 and the third auxiliary circulation channel 170.

The first auxiliary circulation channel 150 has a hollow pipe shape having a fluid channel formed therein in which the lubricating fluid flows. The first auxiliary circulation channel 150 is connected to one side of the receiving member 101 and extends so as to make contact with the drive motor 10.

The second auxiliary circulation channel 160 has a hollow pipe shape having a fluid channel formed therein in which the lubricating fluid flows. The second auxiliary circulation channel 160 is connected to the first auxiliary circulation channel 150 and the third auxiliary circulation channel 170 and extends so as to pass through the contact surface between the drive motor 10 and the inverter 20. The second auxiliary circulation channel 160 may be disposed parallel to the longitudinal direction of the drive motor 10.

The third auxiliary circulation channel 170 has a hollow pipe shape having a fluid channel formed therein in which the lubricating fluid flows. One end portion of the third auxiliary circulation channel 170 is connected to the second auxiliary circulation channel 160, and an opposite end portion of the third auxiliary circulation channel 70 is connected to an opposite side of the receiving member 101. The third auxiliary circulation channel 170 may be disposed parallel to the longitudinal direction of the drive motor 10.

A filter (not illustrated) may be disposed inside or outside the receiving member 101 to prevent infiltration of impurities into the first auxiliary circulation channel 150 or the third auxiliary circulation channel 170. The filter (not illustrated) may be disposed in various spaces as needed. For example, the filter (not illustrated) may be attached to the outside of the receiving member 101, or may be formed inside the receiving member 101.

When the vehicle is accelerated or decelerated in a first direction, the lubricating fluid received in the receiving member 101 is forced and biased to one side. Because the lubricating fluid is received in the receiving member 101, the lubricating fluid is effectively forced depending on the acceleration or deceleration of the vehicle, as compared with when the receiving member 101 is received in the speed reducer 30 in a state of being open at the top.

The receiving member 101 is in communication with the first auxiliary circulation channel 150, the second auxiliary circulation channel 160, and the third auxiliary circulation channel 170. Specifically, the receiving member 101 is connected with the first auxiliary circulation channel 150 and the third auxiliary circulation channel 170. Accordingly, when the vehicle accelerates or decelerates in the first direction as illustrated in FIG. 4, the lubricating fluid received in the receiving member 101 is biased and forced to flow into the first circulation channel 50 or the third circulation channel 70 connected to the receiving member 101. That is, the lubricating fluid may naturally circulate through the acceleration or deceleration of the vehicle even though separate power is not applied. Specifically, the lubricating fluid received in the receiving member 101 is released from the receiving member 101 and then circulated into the receiving member 101 again after sequentially passing through the first auxiliary circulation channel 150, the second auxiliary circulation channel 160, and the third auxiliary circulation channel 170. Alternatively, the lubricating fluid received in the receiving member 101 is released from the receiving member 101 and then circulated into the receiving member 101 again after sequentially passing through the third auxiliary circulation channel 170, the second auxiliary circulation channel 160, and the first auxiliary circulation channel 150.

For convenience of description, FIG. 3 illustrates an example that the transaxle-integrated cooling circulation system according to the inventive concept includes the first circulation channel 50, the second circulation channel 60, and the third circulation channel 70 that are connected with the first circulator 80, and the first auxiliary circulation channel 150, the second auxiliary circulation channel 160, and the third auxiliary circulation channel 170 that are connected with the receiving member 101. In another embodiment, although not illustrated, the transaxle-integrated cooling circulation system according to the inventive concept may not include the first circulation channel 50, the second circulation channel 60, and the third circulation channel 70 and may include only the first auxiliary circulation channel 150, the second auxiliary circulation channel 160, and the third auxiliary circulation channel 170, which are connected with the receiving member 101, to cool the drive motor 10 and the inverter 20.

Figure 6:
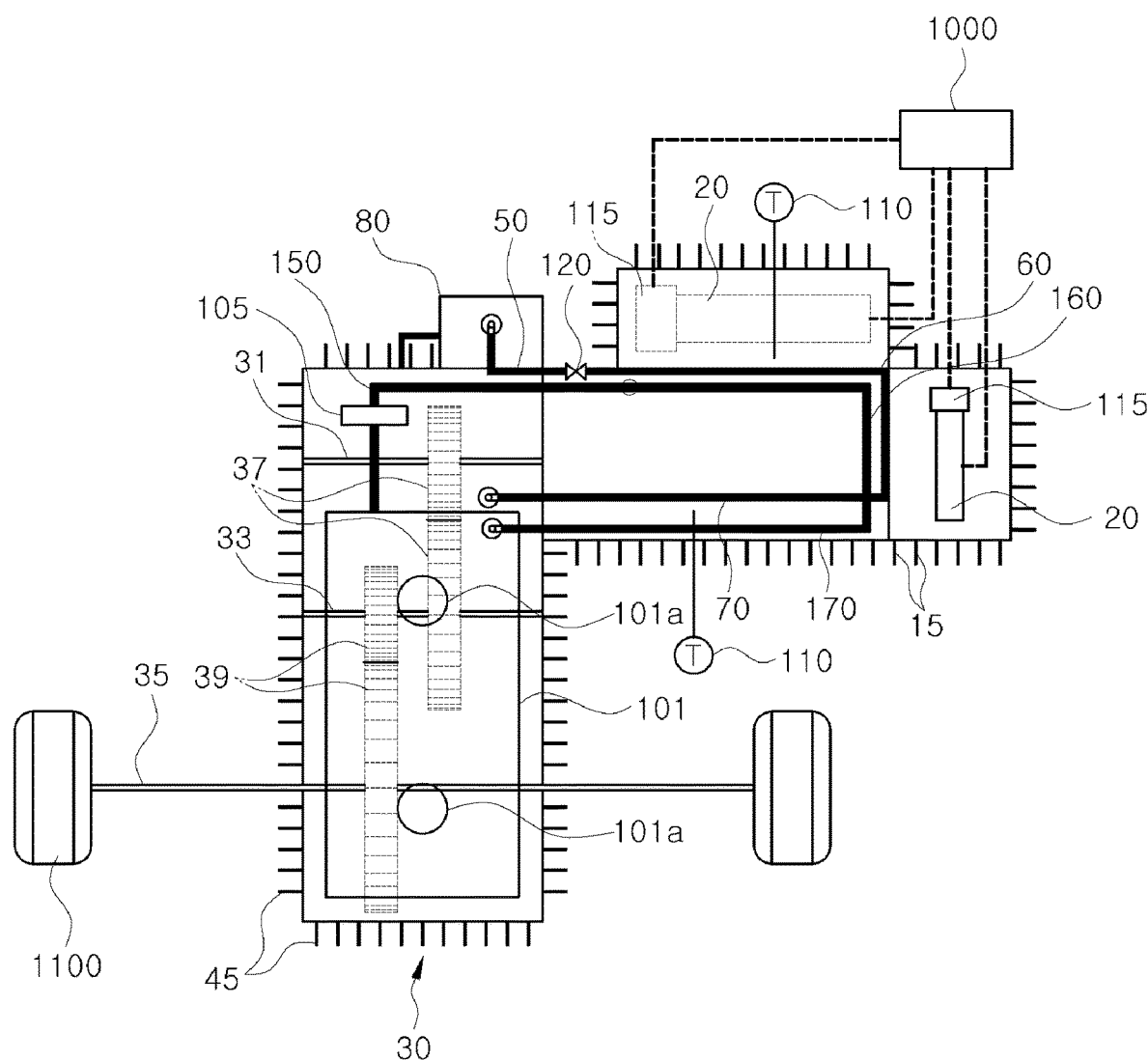
FIG. 6 is a view illustrating a configuration of a transaxle-integrated cooling circulation system according to a third embodiment of the inventive concept.

FIG. 6 illustrates a transaxle-integrated cooling circulation system according to a third embodiment of the inventive concept.

As illustrated in FIG. 6, unlike the above-described transaxle-integrated cooling circulation system according to the second embodiment of the inventive concept, the transaxle-integrated cooling circulation system according to the third embodiment of the inventive concept may forcibly circulate the lubricating fluid in the receiving member 101 through the first auxiliary circulation channel 150, the second auxiliary circulation channel 160, and the third auxiliary circulation channel 170 from the receiving member 101 by using a second circulator 105. However, unlike in FIG. 6, the second circulator 105 may be disposed adjacent to the third auxiliary circulation channel 170. In this case, the lubricating fluid may be forcibly circulated through the third auxiliary circulation channel 170, the second auxiliary circulation channel 160, and the first auxiliary circulation channel 150 from the receiving member 101 by the second circulator 105.

FIG. 6 illustrates an example that the second circulator 105 is disposed inside the speed reducer 30. Without being limited thereto, however, the second circulator 105 may be disposed outside the speed reducer 30. Alternatively, the second circulator 105 may be provided on at least one of the first auxiliary circulation channel 160 or the third auxiliary circulation channel 170.

The second circulator 105 may be implemented with a pump and may forcibly circulate the lubricating fluid in the receiving member 101 under the control of a controller 115, which will be described below, irrespective of acceleration or deceleration of the vehicle.

The transaxle-integrated cooling circulation systems according to the embodiments of the inventive concept may further include temperature sensors 110, the controller 115, and a valve 120.

The temperature sensors 110 are disposed adjacent to the drive motor 10 and the inverter 20 and measure exothermic temperatures of the drive motor 10 and the inverter 20. Temperature data measured by the temperature sensors 110 is transmitted to the controller 115. In this embodiment, the temperature sensors 110 are illustrated as being provided at the drive motor 10 and the inverter 20. Without being limited thereto, however, a temperature sensor may be provided at the drive motor 10 or the inverter 20.

The controller 115 receives and collects the temperature data measured by the temperature sensors 110. Furthermore, when the temperature data measured by the temperature sensors 110 is higher than or equal to a predetermined temperature, the controller 115 transmits a valve control signal to the valve 120 to open the valve 120. Simultaneously, the controller 115 may transmit a control signal to operate the first circulator 80 or the second circulator 105.

The controller 115 may be integrated with the inverter 20.

The valve 120 is provided in the first circulation channel 50 and opens or closes the first circulation channel 50 depending on a control signal of the controller 115.

When the controller 115 determines that the temperature data measured by the temperature sensors 110 is higher than or equal to the predetermined temperature, the controller 115 transmits the valve control signal to the valve 120 to open the valve 120, thereby opening the first circulation channel 50 or the first auxiliary circulation channel 150. Simultaneously, the controller 115 transmits the control signal to operate the first circulator 80 or the second circulator 105. Furthermore, the central control device 1000 of the vehicle transmits, to the inverter 20, a motor control signal generated based on the collected temperature data and controls the current value and the RPM of the drive motor 10.

As the first circulator 80 or the second circulator 105 operates, the lubricating fluid received in the speed reducer 30 is released from the speed reducer 30 and then circulated into the speed reducer 30 after sequentially passing through the first circulation channel 50, the second circulation channel 60, and the third circulation channel 70, or the lubricating fluid received in the receiving member 101 is released from the receiving member 101 and then circulated into the receiving member 101 after sequentially passing through the first auxiliary circulation channel 150, the second auxiliary circulation channel 160, and the third auxiliary circulation channel 170.

At this time, the lubricating fluid flowing through the second circulation channel 60 or the second auxiliary circulation channel 160 absorbs heat generated from the drive motor 10 and the inverter 20 to cool the drive motor 10 and the inverter 20 and thereafter flows into the speed reducer 30 via the third circulation channel 70 or the third auxiliary circulation channel 170. The lubricating fluid flowing through the second circulation channel 60 and the third circulation channel 70 or the lubricating fluid flowing through the second auxiliary circulation channel 160 and the third auxiliary circulation channel 170 is introduced into the speed reducer 30 or the receiving member 101 again after cooled by the cooling jacket 91 provided at the integrated cover structure 90 while being cooled through the cooling jacket, the refrigerant sheet, or the cooling element disposed on an area of the drive motor 10 and the inverter 20.

Meanwhile, the lubricating fluid introduced into the speed reducer 30 or the receiving member 101 again is mixed with the residual lubricating fluid in the speed reducer 30 or the receiving member 101 and is additionally cooled by the second heat radiating structure 45. Thereafter, the lubricating fluid is circulated through the first circulation channel 50, the second circulation channel 60, and the third circulation channel 70, or through the first auxiliary circulation channel 150, the second auxiliary circulation channel 160, and the third auxiliary circulation channel 170, by the first circulator 80 or the second circulator 105 again.

As described above, according to the inventive concept, the transaxle-integrated cooling circulation system circulates the lubricating fluid received in the speed reducer 30, which constitutes the transaxle, to cool the drive motor 10 and the inverter 20, thereby reducing a failure in the drive motor 10 and the inverter 20 and improving the performance of the transaxle.

As described above, according to the inventive concept, the transaxle-integrated cooling circulation system circulates the lubricating fluid received in the speed reducer constituting the transaxle to cool the motor and the inverter, thereby reducing a failure in the motor and the inverter and improving the performance of the transaxle.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A transaxle-integrated cooling circulation system comprising:
   a drive motor;
   an inverter disposed on one surface of the drive motor and electrically connected with the drive motor;
   a speed reducer including a drive shaft connected with a rotary shaft of the drive motor and a driven shaft having a different RPM from the drive shaft;
   a first circulation channel extending to allow a lubricating fluid in the speed reducer to make contact with the drive motor;
   a second circulation channel connected with the first circulation channel and configured to pass through a contact surface between the drive motor and the inverter;
   a third circulation channel connected with the second circulation channel and configured to introduce the lubricating fluid into the speed reducer again;
   a first heat radiating structure provided on the outside of the drive motor; and
   a second heat radiating structure provided on the outside of the speed reducer.

2. The transaxle-integrated cooling circulation system of claim 1, wherein the second circulation channel or the third circulation channel is disposed parallel to a longitudinal direction of the drive motor.

3. The transaxle-integrated cooling circulation system of claim 1, further comprising:
   a first circulator configured to circulate the lubricating fluid.

4. A transaxle-integrated cooling circulation system comprising:
   a drive motor;
   an inverter disposed on one surface of the drive motor and electrically connected with the drive motor;
   a speed reducer including a drive shaft connected with a rotary shaft of the drive motor and a driven shaft having a different RPM from the drive shaft;
   a first circulation channel extending to allow a lubricating fluid in the speed reducer to make contact with the drive motor;

a second circulation channel connected with the first circulation channel and configured to pass through a contact surface between the drive motor and the inverter;

a third circulation channel connected with the second circulation channel and configured to introduce the lubricating fluid into the speed reducer again; and an integrated cover structure disposed on a virtual reference line extending from a contact surface between the speed reducer and the drive motor, wherein one side of the integrated cover structure overlaps the speed reducer, and an opposite side of the integrated cover structure overlaps the drive motor and the inverter, the opposite side being different from the one side.

5. The transaxle-integrated cooling circulation system of claim 4, further comprising:
a coolant-filled cooling jacket configured to surround part of the integrated cover structure.

6. The transaxle-integrated cooling circulation system of claim 4, further comprising:
a third heat radiating structure provided on the outside of the integrated cover structure.

7. A transaxle-integrated cooling circulation system comprising:
a drive motor;
an inverter disposed on one surface of the drive motor and electrically connected with the drive motor;
a speed reducer including a drive shaft connected with a rotary shaft of the drive motor and a driven shaft having a different RPM from the drive shaft;
a first circulation channel extending to allow a lubricating fluid in the speed reducer to make contact with the drive motor;
a second circulation channel connected with the first circulation channel and configured to pass through a contact surface between the drive motor and the inverter;
a third circulation channel connected with the second circulation channel and configured to introduce the lubricating fluid into the speed reducer again;
a receiving member located inside the speed reducer, the receiving member having a receiving space in which the lubricating fluid is received;
a first auxiliary circulation channel connected to one side of the receiving member, the first auxiliary circulation channel extending to allow the lubricating fluid in the receiving member to make contact with the drive motor;
a second auxiliary circulation channel connected with the first auxiliary circulation channel and configured to pass through the contact surface between the drive motor and the inverter; and
a third auxiliary circulation channel connected to the second auxiliary circulation channel and an opposite side of the receiving member,
wherein the receiving member includes at least one insertion hole through which the lubricating fluid outside the receiving member is received in the receiving member, and
wherein the lubricating fluid in the receiving member is biased and circulated through the first auxiliary circulation channel or the third auxiliary circulation channel when the speed reducer is accelerated or decelerated in a first direction.

8. The transaxle-integrated cooling circulation system of claim 7, wherein the receiving member further includes a filter configured to prevent infiltration of impurities into the first auxiliary circulation channel or the third auxiliary circulation channel.

9. The transaxle-integrated cooling circulation system of claim 7, further comprising:
a second circulator configured to circulate the lubricating fluid received in the receiving member into the speed reducer.

10. The transaxle-integrated cooling circulation system of claim 7, further comprising:
a temperature sensor configured to measure exothermic temperature of at least one of the drive motor or the inverter; and
a controller configured to receive and collect temperature data measured by the temperature sensor.

11. The transaxle-integrated cooling circulation system of claim 10, further comprising:
a valve disposed in one of the first auxiliary circulation channel, the second auxiliary circulation channel, and the third auxiliary circulation channel and controlled to be opened or closed depending on a control signal,
wherein the controller is configured to transmit a valve control signal to the valve to open the valve, when the temperature data measured by the temperature sensor is higher than or equal to a predetermined temperature.

12. The transaxle-integrated cooling circulation system of claim 10, wherein the controller is configured to transmit the collected temperature data to a central control device configured to perform control to drive a vehicle, and
wherein the central control device is configured to transmit a motor control signal for controlling a current vale and an RPM of the drive motor to the inverter, the motor control signal being generated based on the collected temperature data.

13. A transaxle-integrated cooling circulation system comprising:
a drive motor;
an inverter disposed on one surface of the drive motor and electrically connected with the drive motor;
a speed reducer including a drive shaft connected with a rotary shaft of the drive motor and a driven shaft having a different RPM from the drive shaft;
a first circulation channel extending to allow a lubricating fluid in the speed reducer to make contact with the drive motor;
a second circulation channel connected with the first circulation channel and configured to pass through a contact surface between the drive motor and the inverter;
a third circulation channel connected with the second circulation channel and configured to introduce the lubricating fluid into the speed reducer again;
a temperature sensor configured to measure exothermic temperature of at least one of the drive motor or the inverter; and
a controller configured to receive and collect temperature data measured by the temperature sensor.

14. The transaxle-integrated cooling circulation system of claim 13, further comprising:
a valve disposed in one of the first circulation channel, the second circulation channel, and the third circulation channel and controlled to be opened or closed depending on a control signal,
wherein the controller is configured to transmit a valve control signal to the valve to open the valve, when the temperature data measured by the temperature sensor is higher than or equal to a predetermined temperature.

15. The transaxle-integrated cooling circulation system of claim 13, wherein the controller is integrated with the inverter.

16. The transaxle-integrated cooling circulation system of claim 13, wherein the controller is configured to transmit the collected temperature data to a central control device configured to perform control to drive a vehicle, and
  wherein the central control device is configured to transmit a motor control signal for controlling a current vale and an RPM of the drive motor to the inverter, the motor control signal being generated based on the collected temperature data.

17. The transaxle-integrated cooling circulation system of claim 13, wherein a coolant-filled cooling jacket, a refrigerant sheet, or a cooling element is provided on at least part of the remaining area other than areas of the drive motor and the inverter where the second circulation channel and the third circulation channel pass.

\* \* \* \* \*